Jan. 28, 1958  J. DOLZA  2,821,181
ENGINE INDUCTION MEANS
Filed Nov. 22, 1954  2 Sheets—Sheet 1
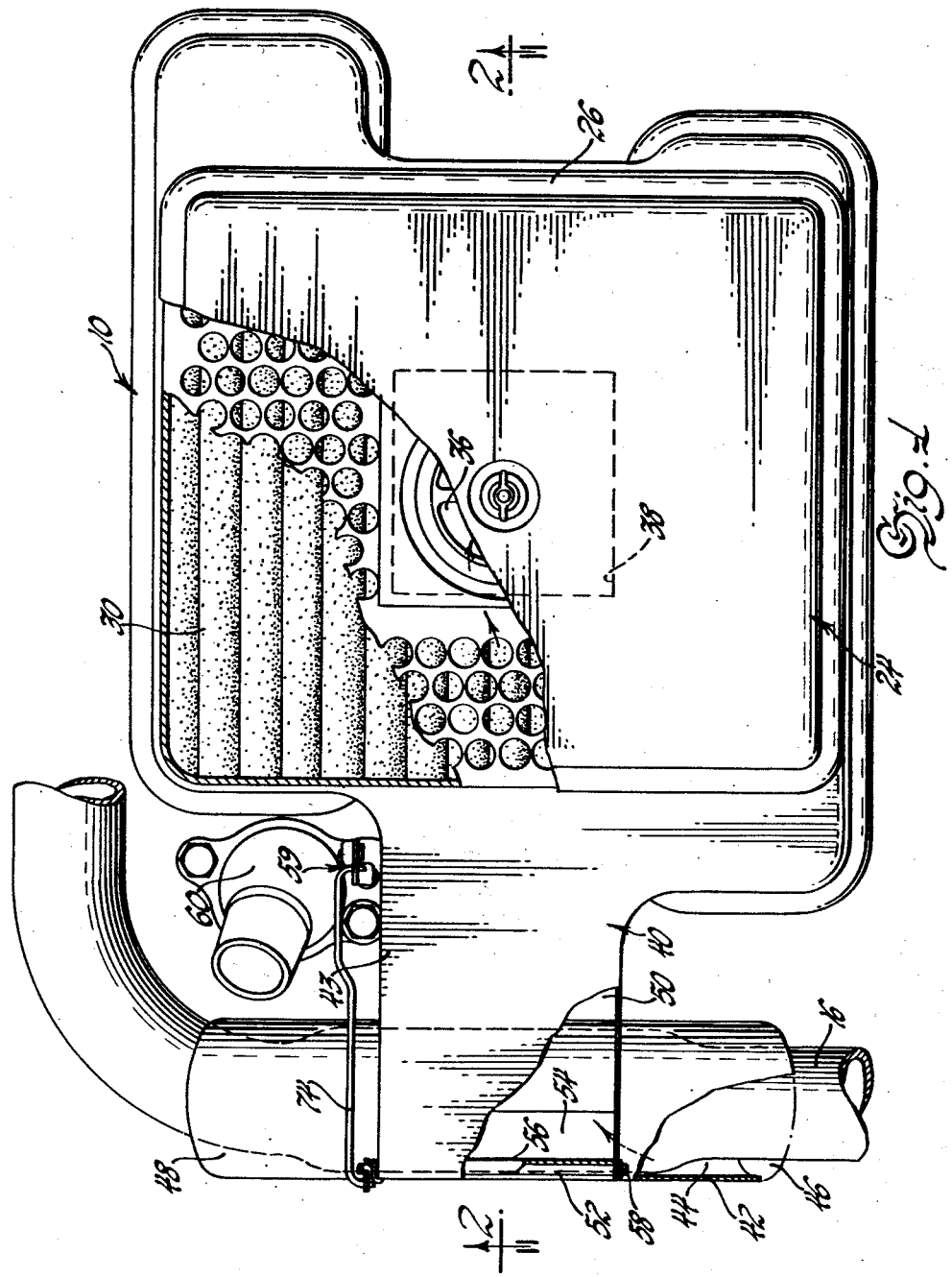
Inventor
John Dolza
By L. I. Burch
Attorney

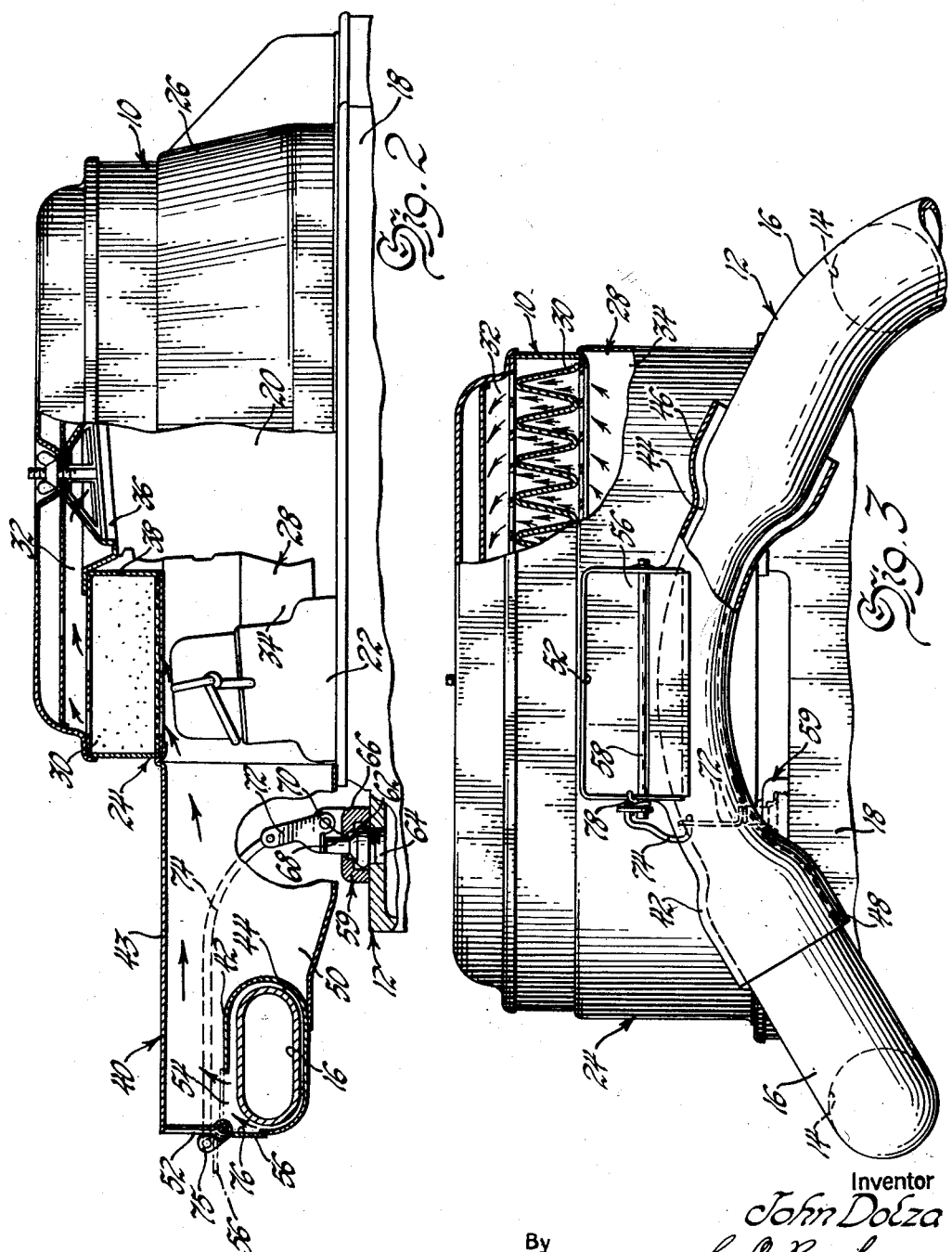

United States Patent Office 2,821,181
Patented Jan. 28, 1958

2,821,181

ENGINE INDUCTION MEANS

John Dolza, Davisburg, Mich., assignor to General Motors Corporation, Detroit, Mich., a corporation of Delaware Application November 22, 1954, Serial No. 470,200

11 Claims. (Cl. 123—122)

The present invention relates to engines and more particularly to induction systems therefor.

When an internal combustion engine is operated below sub-normal temperatures, it is difficult to obtain proper carburization of the fuel in the air. This is a result of the low temperature of the induction system being inadequate to evaporate a sufficient amount of fuel for proper distribution of the charge and proper combustion in the cylinder. In order to facilitate the operation of the engine at sub-normal temperatures, numerous attempts have been made to heat the charge in the induction system to prevent the precipitation of the fuel particles. In the past this has usually been accomplished by providing an exhaust crossover passage that extends transversely through the intake manifold in heat exchanging relation with the walls of the distribution passages of the intake manifold. Thus if any of the fuel particles precipitate out of the charge, they will strike the heated walls of the distribution passage and the heat will cause them to be rapidly reevaporated. This reevaporation of the condensed fuel particles results in a more effective carburization of the fuel during cold operation of the engine. However, after the engine has reached normal operating temperatures, it has been found extremely difficult to prevent the exhaust gases flowing through the crossover passage. As a result, there is a large amount of engine heat dissipated in and around the induction system so that the volumetric efficiency is greatly reduced.

It is now proposed to provide means for heating the air for the induction system before it enters the carburetor. This is to be accomplished by providing an induction system which has two separate air intakes and valve means that control the intake the air flows through. One of these intakes may include a shroud which is disposed around the exhaust crossover pipe to form a heating passage in heat exchanging relation with the exhaust system. Thus when the engine is cold, the air may flow around the exhaust system and be heated thereby. The other intake may include an opening to the atmosphere to allow unheated air to be drawn directly into the induction system. At the same time the valve means may also direct a flow of cool air through said heating passage in a reverse direction for cooling the exhaust system and preventing any undesired heating of the charge and overheating of the exhaust heat exchanger. A thermostat may be provided in heat exchanging relation with the engine for positioning the valve means in response to engine temperatures. Thus it may be seen that an induction system may be provided which will effectively heat the charge when the engine is cold without heating the charge when the engine has become thoroughly heated.

In the two sheets of drawings:

Figure 1 is a plan view of an induction system employing the present invention with a portion thereof being broken away.

Figure 2 is a cross sectional elevational view of the induction system of Figure 1 taken substantially along the plane of line 2—2.

Figure 3 is a front elevational view of the induction system.

Referring to the drawings in more detail, the present invention may be embodied in an induction system 10 for an internal combustion engine 12. It should be understood that the present invention may be incorporated in various types of engines; however, in the present instance for purposes of illustration, it is particularly adapted for use on a so-called V-type having a cylinder block with a pair of angularly disposed cylinder banks. Exhaust manifolds 14 may extend along the opposite sides of the engine 12 for collecting the hot exhaust gases from the cylinders and conveying them to the atmosphere by means of an exhaust system. An exhaust crossover pipe 16 may be provided which extends around the front end of the engine 12 to interconnect the two exhaust manifolds 14.

The induction system 10 for charging the cylinders may include an intake manifold 18 that is mounted on the engine 12 in the space formed between the two banks of cylinders. The intake manifold 18 preferably has a carburetor 20 in the middle thereof and a plurality of distribution passages that communicate with the various cylinders for carrying the combustible charge to the cylinders. A fuel pump 22 may be mounted on the intake manifold immediately adjacent the carburetor 20 to insure an adequate supply of fuel to the carburetor 20.

An air cleaner and silencer assembly 24 may be provided in order to silence the flow of air entering the induction system 10 and also to eliminate any dust that may be present in the air. Although this assembly 24 may be of any suitable construction, in the present instance it includes a housing 26 mounted on the intake manifold 18 to form a chamber 28. A filter element 30 may be horizontally disposed in this chamber 28 to divide it into an upper compartment 32 and a lower compartment 34. The fuel pump 22 and carburetor 20 may be mounted in the lower compartment 34 with the intake 36 for the carburetor 20 projecting upwardly through an opening 38 in the filter element 30 to communicate with the upper compartment 32. Thus the air may flow upwardly from the lower compartment 34 through the filter 30 and radially inwardly into the carburetor intake 36.

The intake 40 for the cleaner and silencer assembly 24 may comprise a shroud 42 disposed concentrically around the exhaust crossover pipe 16 and an extension 43 of the housing 26 that terminates adjacent the shroud 42. The shroud 42 may comprise a sleeve that is mounted concentrically about the exhaust crossover pipe 16 in spaced relation thereto. The shroud 42 will thus form a heating passage 44 in heat exchanging relation with the exhaust pipe 16. The opposite ends 46 and 48 of this heating passage 44 may be open to the atmosphere so as to allow air to flow freely through the passage 44.

The extension 43 of the housing 26 may project forwardly toward the shroud 42 so as to form an intake passage 50 that has one end thereof communicating with the lower compartment 34. The opposite end of the extension may form a rectangular opening 52 that may serve as an intake for the induction system 10. This intake opening 52 may be in the form of an elongated rectangle positioned adjacent an aperture 54 in one wall of the shroud 42.

A butterfly valve 56 may be mounted on a horizontal pin 58 which extends across the rectangular intake opening 52. When the valve 56 is in the vertical or closed position, it will close the intake opening 52 and prevent air flowing directly into the intake passage 50. However under these circumstances, the aperture 54 in the shroud 42 will interconnect the heating passage 44 with the intake passage 50. Thus the air for the induction system may be drawn through the heating passage 44 in heat exchanging relation with the exhaust crossover pipe 16 and then through the aperture 54 into the intake passage 50. When the valve 56 is moved into the horizontal or open position, the intake opening 52 will be open and the air may flow from the atmosphere directly into the intake passage 50 and induction system 10 thus improving the volumetric efficiency of the engine. At the same time the aperture 54 in the shroud 42 will be opened to the atmosphere. Thus if there is any air circulated around the engine 12 by a cooling fan and/or forward movement of the engine, the air may flow through the aperture 54 into the heating passage 44 and outwardly from the opposite ends 46 and 48 thereof. This cooling air will absorb heat from the exhaust crossover pipe 16 and thus prevent excessive heating of the exhaust pipe 16 and deterioration of it.

Thermostatic means 59 may be provided on the engine 12 for automatically positioning the valve 56 between the opened and closed positions in response to engine temperature. The present means is mounted on the manifold 18 adjacent an outlet 60 for the liquid coolant in the cooling system. Thus as the coolant flows out of the engine 12, it will pass in heat exchanging relation to the thermostat 59 and will thereby give an accurate index of the engine temperature. The present thermostat 59 includes a temperature responsive element 62 and a retainer 66 for securing the element 62 in position. The element 62 is preferably positioned in a passage 64 that extends through one wall of the engine into the coolant jacket thereby placing the thermostat in intimate contact with the liquid coolant. A plunger 68 may be reciprocably disposed in an opening 70 in the top of the retainer 66 so that the lower end thereof will seat on the thermostatic element 62. Thus the changes in coolant temperature will result in axial movement of the plunger 68 through the opening 70. In order to transfer movement of this plunger 68 to the butterfly valve 56, a bell crank 72 may be mounted on the retainer 66 so that one arm engages the plunger 68 and the other arm receives a push rod 74 connected to a lever 75 on the valve 56. A spring 78 may be provided that opposes the capsule 62 and biases the valve 56 closed.

When the engine 12 is cold the thermostatic element 62 will be contracted to its minimum length which will allow the spring 78 to bias the butterfly 56 into the vertical or closed position. When the valve 56 is in this position, the air will flow inwardly from the opposite ends 46 and 48 of the heating passage 44 formed by the shroud 42. As the air flows through this passage 44, it will pass in heat exchanging relation with the exhaust crossover pipe 16 and be heated thereby. After the air has been heated, it may pass through the aperture 54 into the intake passage 50. From here the heated air will flow into the lower compartment 34, up through the filter element 30, into the upper compartment 32 and then into the carburetor intake 36. As a result when the engine 12 is cold, the incoming air will be preheated by the exhaust system before it enters the carburetor 20. This in turn will greatly increase the air's ability to absorb the atomized fuel and thereby improve the carburization of the fuel into the charge.

As the engine 12 becomes heated, the thermostatic element 62 will expand and raise the plunger 68. The rising plunger 68 will cause the bell crank 72 and link 74 to swing the butterfly valve 56 from the closed position into the open position. When the valve 56 reaches the open position, the air from the atmosphere may flow directly into the intake passage 50. The cool fresh air may then flow into the lower compartment 34, the air filter 30, the upper compartment 32 and then into the carburetor 20. Thus when the engine has attained satisfactory operating temperatures, the air will no longer be heated but instead will be drawn directly from the atmosphere. Accordingly, the volumetric efficiency will be greatly improved.

It should be noted that when the valve 56 is open, the air may also flow through the lower portion 76 of the inlet into the aperture 54 in the shroud 42. Thus if there is a cooling fan and/or movement of the engine that circulates air against the front of the engine, air may flow into the heating passage 44. This air may then flow in a reverse direction outwardly through the heating passage 44. Thus a flow of cool air will be directed around the exhaust crossover pipe 16 to absorb the excess heat therefrom. This will greatly reduce the temperature of the surrounding structure thereby prolonging the useful life thereof. In addition, there will be little heat transferred to the induction system even when the engine is very hot. This allows adequate heating of the fuel charge when desired but at the same time, it substantially eliminates heating of the charge when it is not desired.

Various changes and modifications of the embodiment of the invention described herein may be made by those skilled in the art without departing from the spirit and principles of the invention.

What is claimed is:

1. The combination of an induction system for an engine, an exhaust system for said engine, said induction system having an intake which includes a heating passage disposed in heat exchanging relation with a portion of said exhaust system, and valve means movable between two positions, said valve means when in one of said positions allowing a stream of air to flow from the atmosphere directly into said induction system and a separate stream of cooling air to flow around said portion.

2. The combination of an induction system for an engine, an exhaust system for said engine, said induction system having an intake which includes a heating passage disposed in heat exchanging relation with a portion of said exhaust system, and valve means movable between two positions, said valve means when in one of said positions allowing a first stream of air to flow from said heating passage into said induction system and when in another of said positions to allow a second stream of cooling air to flow from the atmosphere through said heating passage.

3. In an engine having cylinders therein, an induction system for delivering a combustible charge to said cylinders, an exhaust system for discharging the hot exhaust gases from said cylinders into the atmosphere, an intake for said induction system having an intake passage and a heating passage in heat exchanging relation with a portion of said exhaust system, said heating passage having at least one end thereof open to the atmosphere, and valve means movable between two extreme positions, said valve means when in one of said positions interconnecting said intake passage and said heating passage directly with the atmosphere and in the other of said positions interconnecting said intake passage with said heating passage.

4. In an engine having cylinders therein, an induction system for delivering a combustible charge to said cylinders, an exhaust system for discharging the hot exhaust gases from said cylinders into the atmosphere, an intake for said induction system having an intake passage and a heating passage in heat exchanging relation with a portion of said exhaust system, said heating passage having at least one end thereof open to the atmosphere, valve means movable between two extreme positions, said valve means when in one of said positions interconnecting said intake passage and said heating passage directly with the atmosphere and in the other of said positions interconnecting said intake passage with said heating passage, and thermostatic means responsive to the temperature of said engine for moving said valve means between said extreme positions.

5. The combination of an induction system for an engine, an exhaust system for said engine, an intake for said induction system which includes a shroud forming a heating passage disposed in heat exchanging relation with said exhaust system, said heating passage communicating with the atmosphere, and valve means movable between two extreme positions, said valve means when in one of said positions allowing the air in said induction system to be drawn from said heating passage, said valve means when in the other of said positions allowing air to simultaneously flow from the atmosphere directly into said heating passage and also from the atmosphere directly into said induction system.

6. The combination of an induction system for an engine, an exhaust system for said engine, an intake for said induction system which includes a shroud forming a heating passage disposed in heat exchanging relation with said exhaust system, said heating passage communicating with the atmosphere, valve means movable between two extreme positions, said valve means when in one of said positions allowing the air in said induction system to be drawn from said heating passage, said valve means when in the other of said positions allowing air to simultaneously flow from the atmosphere directly into said heating passage and also from the atmosphere directly into said induction system, and thermostatic means responsive to the temperature of said engine for moving said valve means between said extreme positions in response to said engine temperature.

7. In an engine having an exhaust system the combination of a shroud disposed in spaced relation to a portion of said exhaust system to form a heating passage open to the atmosphere, an induction system having a portion thereof forming an inlet positioned adjacent said shroud, said inlet including a first aperture opening into the atmosphere and a second aperture opening into said heating passage in said shroud, valve means mounted for movement between two extreme positions, said valve means when in one of said positions closing said first aperture and when in the other of said positions only partially closing said second aperture to isolate said inlet from said heating passage but to open both apertures to the atmosphere.

8. In an engine having a pair of angularly disposed cylinder banks, an induction system disposed between said banks for delivering a combustible charge to said cylinders, exhaust manifolds disposed on the opposite sides of said engine for conveying hot exhaust gases discharged from said cylinders to the atmosphere, an exhaust crossover pipe extending across one end of said engine for interconnecting said exhaust manifolds, an intake for said induction system including an intake passage and a shroud, said shroud being positioned to form a heating passage in heat exchanging relation with said crossover pipe with at least one end of said heating passage being open to the atmosphere, and valve means movable between two extreme positions, said valve means when in one of said positions interconnecting said intake passage and said heating passage directly with the atmosphere and in the other of said positions interconnecting said intake passage with said heating passage.

9. The combination of claim 8 including a thermostat responsive to engine temperature for moving said valve means between said two extreme positions in response to engine temperature.

10. In an engine having a pair of angularly disposed banks of cylinders, the combination of an induction system disposed between said banks for delivering a combustible charge to said cylinders, exhaust manifolds disposed on the opposite sides of said engine for collecting the exhaust gases from said cylinders, an exhaust crossover pipe extending around one end of said engine and interconnecting said exhaust manifolds, a shroud comprising a sleeve disposed in concentric spaced relation to a portion of said exhaust crossover pipe to form a heating passage having the opposite ends thereof open to the atmosphere, said shroud including an aperture communicating with said heating passage intermediate said opposite ends, said induction system having a portion thereof forming an intake passage having an inlet contiguous with said aperture in said shroud so as to communicate with both said aperture and the atmosphere, valve means mounted for movement between an opened position and a closed position, said valve means when in said closed position closing said inlet to interconnect said intake passage with said heating passage by means of said aperture, said valve means when in said open position closing said aperture between said passages and opening said inlet and said aperture to the atmosphere.

11. The combination of claim 10 including a thermostat disposed in heat exchanging relation with said engine for moving said valve means between said opened and closed positions in response to engine temperature.

References Cited in the file of this patent

UNITED STATES PATENTS

| | | |
|---|---|---|
| 1,933,365 | Chandler et al. | Oct. 31, 1933 |
| 2,058,204 | Ball et al. | Oct. 20, 1936 |
| 2,084,991 | Callahan | June 29, 1937 |
| 2,334,561 | Kopplin | Nov. 16, 1943 |
| 2,396,317 | Cutts | Mar. 12, 1946 |
| 2,398,094 | Heymann | Apr. 9, 1946 |